United States Patent
Agrawal

(10) Patent No.: US 10,388,169 B2
(45) Date of Patent: *Aug. 20, 2019

(54) SYSTEM AND METHOD FOR PROVIDING IN-FLIGHT WEATHER INFORMATION TO COMPUTE AN OPTIMIZED VERTICAL FLIGHT PROFILE

(71) Applicant: AIRBUS GROUP INDIA PRIVATE LIMITED, Bangalore (IN)

(72) Inventor: Ashutosh Agrawal, Bangalore (IN)

(73) Assignee: AIRBUS GROUP INDIA PRIVATE LIMITED, Bangalore, Karnataka (IN)

( * ) Notice: Subject to any disclaimer, the term of this patent is extended or adjusted under 35 U.S.C. 154(b) by 327 days.

This patent is subject to a terminal disclaimer.

(21) Appl. No.: 14/797,191

(22) Filed: Jul. 13, 2015

(65) Prior Publication Data
US 2016/0019796 A1 Jan. 21, 2016

(30) Foreign Application Priority Data
Jul. 17, 2014 (IN) .......................... 3524/CHE/2014

(51) Int. Cl.
*G08G 5/00* (2006.01)
*G08G 1/08* (2006.01)
*G01W 1/08* (2006.01)
*G01W 1/00* (2006.01)

(52) U.S. Cl.
CPC ............ *G08G 5/0039* (2013.01); *G01W 1/08* (2013.01); *G08G 5/0013* (2013.01); *G08G 5/0021* (2013.01); *G08G 5/0026* (2013.01); *G08G 5/0034* (2013.01); *G08G 5/0091* (2013.01); *G01W 2001/006* (2013.01)

(58) Field of Classification Search
CPC .. G08G 5/0039; G08G 5/0021; G08G 5/0013; G08G 5/0034; G08G 5/0091; G08G 5/0026; G01W 1/08; G01W 2001/006
See application file for complete search history.

(56) References Cited

U.S. PATENT DOCUMENTS

| 6,014,606 | A | * | 1/2000 | Tu | ........................... | G01W 1/08 342/26 A |
|---|---|---|---|---|---|---|
| 2013/0006512 | A1 | * | 1/2013 | Saggio | ................. | G08G 5/0013 701/120 |
| 2014/0358441 | A1 | * | 12/2014 | Hale | ...................... | G01W 1/02 702/3 |
| 2015/0304813 | A1 | * | 10/2015 | Esposito | ................. | H04B 7/155 455/456.2 |
| 2015/0339933 | A1 | * | 11/2015 | Batla | ..................... | G08G 5/0069 701/120 |

(Continued)

Primary Examiner — Rodney A Butler
(74) Attorney, Agent, or Firm — Prakash Nama; Global IP Services, PLLC

(57) ABSTRACT

A system and method for providing in-flight weather information to compute an optimized vertical flight profile are disclosed. In one embodiment, on-board weather information is obtained from one or more aircraft at regular intervals during flight. Further, weather information is identified for a predicted flight trajectory of an aircraft from the obtained on-board weather information. For example, the aircraft is preceding the at least one aircraft. Furthermore, a subset of the identified weather information is dynamically provided to a flight management system (FMS) in the aircraft, during flight, to compute the optimized vertical flight profile.

22 Claims, 13 Drawing Sheets

(56) References Cited

U.S. PATENT DOCUMENTS

2016/0019798 A1* 1/2016 Agrawal ................ B64D 45/00
   701/14
2016/0217694 A1* 7/2016 Batla .................... G08G 5/0034
2016/0327406 A1* 11/2016 Oostveen ........... G01C 21/3667

* cited by examiner

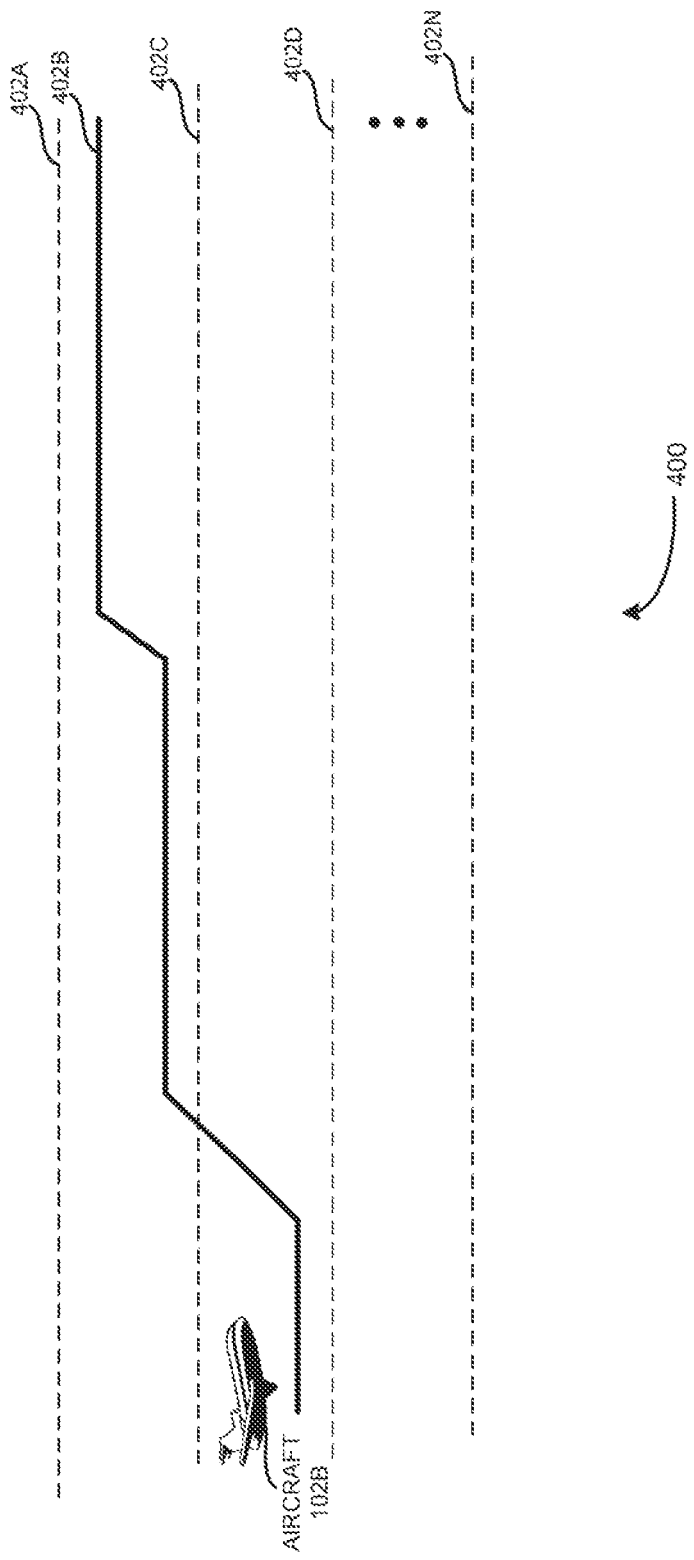

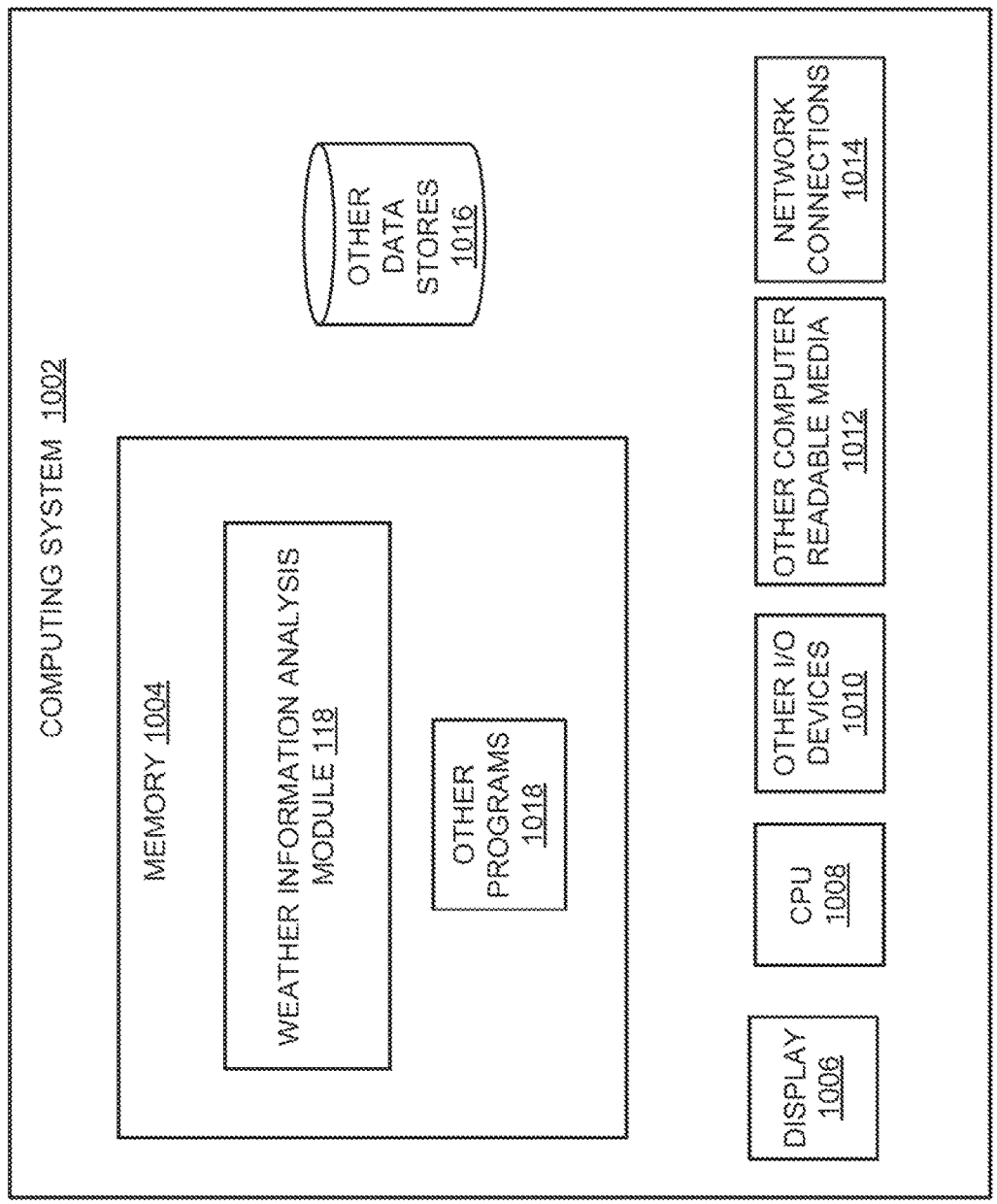

SYSTEM AND METHOD FOR PROVIDING IN-FLIGHT WEATHER INFORMATION TO COMPUTE AN OPTIMIZED VERTICAL FLIGHT PROFILE

RELATED APPLICATIONS

Benefit is claimed under 35 U.S.C. 119(a)-(d) to Foreign application Serial No. 3524/CHE/2014 filed in India entitled "SYSTEM AND METHOD FOR PROVIDING IN-FLIGHT WEATHER INFORMATION TO COMPUTE AN OPTIMIZED VERTICAL FLIGHT PROFILE", on Jul. 17, 2014, by AIRBUS GROUP INDIA PRIVATE LIMITED, which is herein incorporated in its entirety by reference for all purposes.

TECHNICAL FIELD

Embodiments of the present subject matter generally relate to providing weather information to aircrafts, and more particularly, to providing in-flight weather information to compute an optimized vertical flight profile.

BACKGROUND

Typically, forecasted weather information, such as wind speed, wind direction, temperature, pressure and so on along a predicted flight trajectory is given to a flight management system (FMS), before departure of an aircraft, for pre-flight planning. During the pre-flight planning, the FMS computes a vertical flight profile for the aircraft, along the predicted flight trajectory, using the forecasted weather information. The vertical flight profile includes information, such as departure and arrival points, various waypoints, estimated time, speed and altitude at each waypoint, top of climb (TOC), top of descent (TOD) point and so on. However, weather conditions encountered by the aircraft during flight may be different from the forecasted weather information. In such scenarios, the computed vertical flight profile may be inaccurate and the aircraft may fly at non-optimal altitudes, speeds and thrust settings, resulting in an increase in fuel consumption, inaccurate estimated time of arrival (ETA), inaccurate fuel on-board (FOB) and so on.

SUMMARY

A system and method for providing in-flight weather information to compute an optimized vertical flight profile are disclosed. According to one aspect of the present subject matter, on-board weather information is obtained from one or more aircraft at regular intervals during flight. Further, weather information is identified for a predicted flight trajectory of an aircraft from the obtained on-board weather information. For example, the aircraft is preceding the one or more aircraft. Furthermore, a subset of the identified weather information is dynamically provided to a flight management system (FMS) in the aircraft, during flight, to compute the optimized vertical flight profile.

According to another aspect of the present subject matter, a weather information analysis system includes one or more processor and memory coupled to the one or more processor. Furthermore, the memory includes a weather information analysis module to perform the method described above.

According to yet another aspect of the present subject matter, a non-transitory computer-readable storage medium for providing in-flight weather information to compute an optimized vertical flight profile, having instructions that, when executed by a computing device causes the computing device to perform the method described above.

The system and method disclosed herein may be implemented in any means for achieving various aspects. Other features will be apparent from the accompanying drawings and from the detailed description that follow.

BRIEF DESCRIPTION OF THE DRAWINGS

Various embodiments are described herein with reference to the drawings, wherein:

FIG. 4 is a schematic diagram illustrating a first plurality of altitudes for a cruise phase of the predicted flight trajectory of the aircraft, according to an embodiment;

FIG. 10 is a block diagram of an exemplary physical computing system for implementing a weather information analysis module, according to an embodiment.

The drawings described herein are for illustration purposes only and are not intended to limit the scope of the present disclosure in any way.

DETAILED DESCRIPTION

A system and method for providing in-flight weather information to compute an optimized vertical flight profile are disclosed. In the following detailed description of the embodiments of the present subject matter, references are made to the accompanying drawings that form a part hereof, and in which are shown by way of illustration specific embodiments in which the present subject matter may be practiced. These embodiments are described in sufficient detail to enable those skilled in the art to practice the present subject matter, and it is to be understood that other embodiments may be utilized and that changes may be made without departing from the scope of the present subject matter. The following detailed description is, therefore, not to be taken in a limiting sense, and the scope of the present subject matter is defined by the appended claims.

Embodiments described herein provide methods and systems for providing in-flight weather information to compute an optimized vertical flight profile. The example technique disclosed herein provides a weather information analysis module in a ground station to obtain on-board weather information from flying aircrafts at regular intervals. Exemplary weather information includes wind speed information, wind direction information, temperature information, pressure, and the like. Further, the weather information analysis module updates a weather grid using the obtained on-board weather information.

Furthermore, the weather information analysis module identifies weather information for a predicted flight trajectory of an aircraft from the updated weather grid. In one example, the aircraft is preceding the flying aircrafts. In addition, the weather information analysis module analyses the identified weather information to obtain a subset of the identified weather information, such that the subset of identified weather information best represents a weather profile the aircraft may encounter ahead. The weather information analysis module then dynamically provides the subset of identified weather information to a flight management system (FMS) in the aircraft, during flight, to compute the optimized vertical flight profile.

Figure 1:
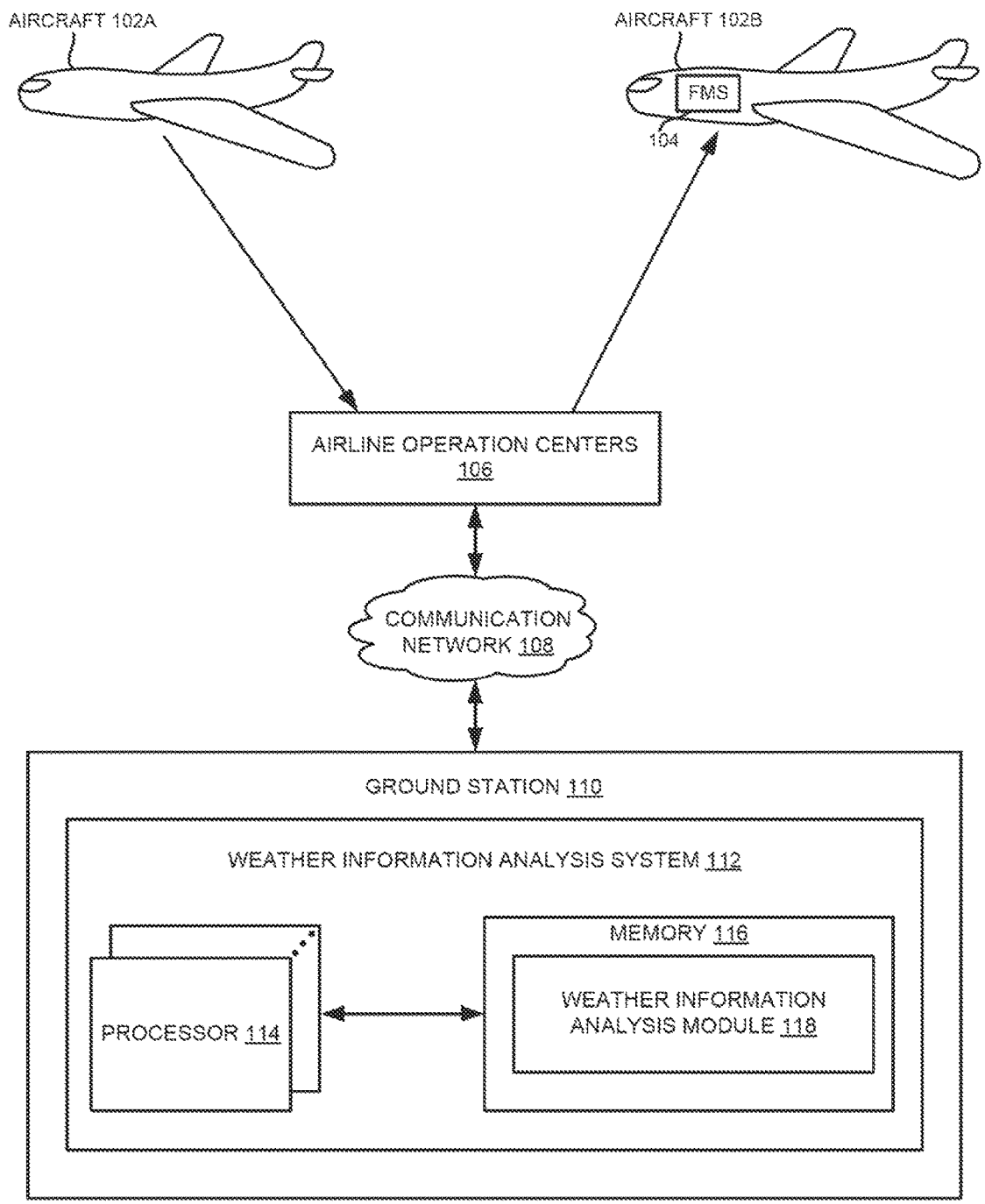
FIG. 1 is a block diagram illustrating an exemplary system for providing in-flight weather information to compute an optimized vertical flight profile, according to an embodiment.

Referring now to FIG. 1, which is a block diagram illustrating an exemplary system 100 for providing in-flight weather information to compute an optimized vertical flight profile, according to an embodiment. As shown in FIG. 1, the system 100 includes airline operation centers 106 and a ground station 110. Further as shown in FIG. 1, the ground station 110 includes a weather information analysis system 112 having one or more processors 114 and memory 116 coupled to the processors 114. Furthermore, the memory 116 includes a weather information analysis module 118.

In addition, the ground station 110 is communicatively connected to the airline operation centers 106 via a communication network 108. Exemplary communication network includes Internet, a virtual private network (VPN) and the like. In the example illustrated in FIG. 1, the airline operation centers 106 communicate with aircrafts 102A and 102B via high frequency/very high frequency (HF/VHF) channels and the like. In this example, the aircraft 102B is preceding the aircraft 102A. In one example, each aircraft may be communicatively connected to an associated airline operation center in the vicinity of the aircraft.

In operation, the aircraft 102A monitors weather information, during flight, using on-board systems, such as aircraft condition monitoring systems (ACMS) and the like. Exemplary weather information includes wind speed information, wind direction information, temperature information, pressure, and the like. Further, the aircraft 102A sends the monitored on-board weather information to associated one of the airline operation centers 106. For example, the aircraft 102A sends the on-board weather information every 30 to 40 seconds during a climb phase and descent phase and every 1 to 3 minutes during a cruise phase.

Further in operation, the weather information analysis module 118 obtains the on-board weather information associated with the aircraft 102A from the airline operation centers 106 via the communication network 108. Similarly, the weather information analysis module 118 obtains on-board weather information associated with other flying aircrafts from the airline operation centers 106. In one example, the weather information analysis module 118 can directly communicate with the aircrafts. Furthermore, the weather information analysis module 118 updates a weather grid (e.g., a weather grid 200 shown in FIG. 2), residing in the memory 116, using the obtained on-board weather information. For example, weather grid represents a geographical area which is divided into a mesh of regularly spaced nodes. Further, the nodes are the locations at which the on-board weather information is obtained. This is explained in detail with reference to FIG. 2. In addition, the weather information analysis module 118 identifies weather information for a predicted flight trajectory including a climb phase, a cruise phase and a descent phase of the aircraft 102B from the weather grid. This is explained in detail with reference to FIG. 3.

In one example embodiment, during the cruise phase of the aircraft 102B, the weather information analysis module 118 identifies weather information for a first plurality of altitudes from the weather grid. This is explained in detail with reference to FIGS. 6A and 68B. For example, the first plurality of altitudes includes an altitude of the cruise phase and a plurality of altitudes above and below the altitude of the of the cruise phase, as shown in FIG. 4.

Further, the weather information analysis module 118 determines a weather profile for each of the first plurality of altitudes based on the identified weather information. This is explained in detail with reference to FIG. 6C. Exemplary weather profile includes a wind speed profile, a wind direction profile, a temperature profile and the like.

Furthermore, the weather information analysis module 118 selects a subset of the identified weather information from each weather profile associated with each of the first plurality of altitudes. The subset of identified weather information for each weather profile is selected such that the subset represents the weather profile. This is explained in detail with reference to FIGS. 5D and 6. Further, the weather information analysis module 118 dynamically provides the subset of identified weather information associated with each of the first plurality of altitudes to a FMS 104 in the aircraft 102B, during flight, via the airline operation centers 106. In addition, the FMS 104 computes an optimized vertical flight profile for the cruise phase of the aircraft 102B using the subset of identified weather information associated each of the first plurality of altitudes.

In another example embodiment, during the climb phase and descent phase of the aircraft 102B, the weather information analysis module 118 identifies weather information for a second plurality of altitudes along the predicted flight trajectory from the weather grid. This is explained in detail with reference to FIG. 7B. For example, the second plurality of altitudes includes altitudes encountered along the predicted flight trajectory for the climb phase and the descent phase of the aircraft 102B. This is explained in detail with reference to FIG. 7A.

Further, the weather information analysis module 118 determines a weather profile for each of the climb phase and the descent phase of the aircraft 102B along the second plurality of altitudes based on the identified weather information. This is explained in detail with reference to FIG. 7C. Furthermore, the weather information analysis module 118 selects a subset of the identified weather information from each weather profile associated with the climb phase and the descent phase. The subset of identified weather information for each weather profile is selected such that the subset represents the weather profile. This is explained in detail with reference to FIGS. 7D and 8.

In addition, the weather information analysis module 118 dynamically provides the subset of identified weather information associated each of the climb phase and the descent phase to the FMS 104 in the aircraft 102B, during flight, via the airline operation centers 106. In addition, the FMS 104 computes an optimized vertical flight profile for the climb phase and descent phase of the aircraft 102B using the subset of identified weather information obtained during the climb phase and descent phase, respectively.

Figure 2:
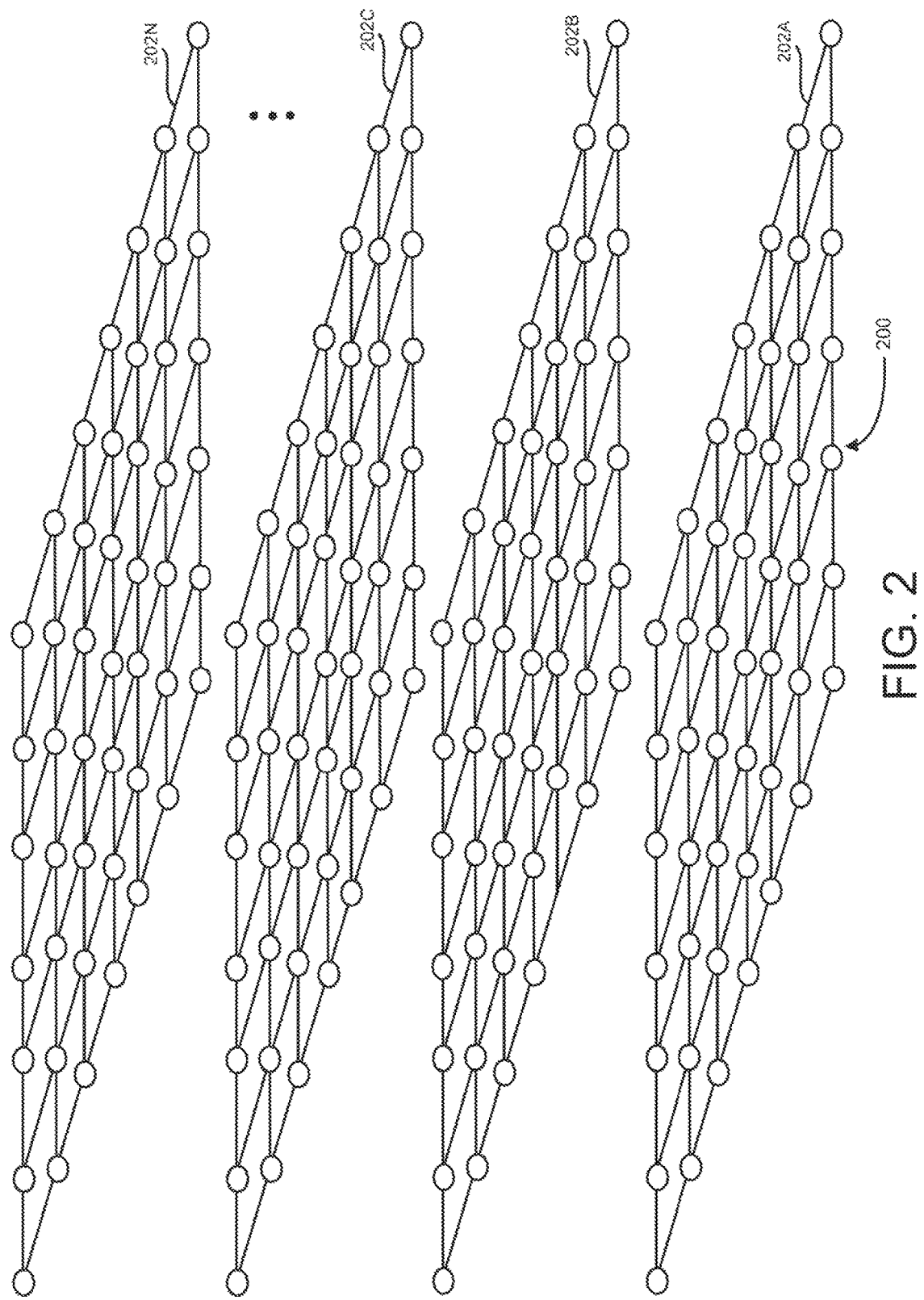
FIG. 2 is a schematic diagram illustrating an exemplary high resolution weather grid including on-board weather information obtained from aircrafts at regular intervals during flight, according to an embodiment.

Referring now to FIG. 2, which is a schematic diagram illustrating an exemplary high resolution weather grid 200 including on-board weather information obtained from aircrafts, at regular intervals, during flight, according to an embodiment. As shown in FIG. 2, the weather grid 200 includes a plurality of regularly spaced nodes at specified altitudes 202A-N from ground. For example, each node in the weather grid 200 is associated with latitude, longitude and altitude values which represent a specific location at which weather information is obtained.

In one example, the weather information analysis module 118, shown in FIG. 1, updates the weather grid 200 using the on-board weather information obtained from the aircraft 102A. The on-board weather information includes a flight number, a time of observation, a phase of flight, a wind speed, a wind direction, a temperature, a flight trajectory data and the like. For example, the weather information analysis module 118 obtains values of wind speed, wind direction and temperature associated with a location (latitude A1, longitude A2, altitude A3) on a flight trajectory of the aircraft 102A. Further, the weather information analysis module 118 updates the obtained values in a node associated with the location (latitude A1, longitude A2, altitude A3) in the weather grid 200.

Similarly, the weather information analysis module 118 updates the weather grid 200 using on-board weather information obtained from all flying aircrafts and associated flight trajectory data. For example, the weather grid 200 may be updated every 20 to 30 minutes. Further, the weather information analysis module 118 can update the weather grid 200 using weather information obtained from meteorological agencies and other ground stations monitoring and forecasting weather information.

Figure 3:
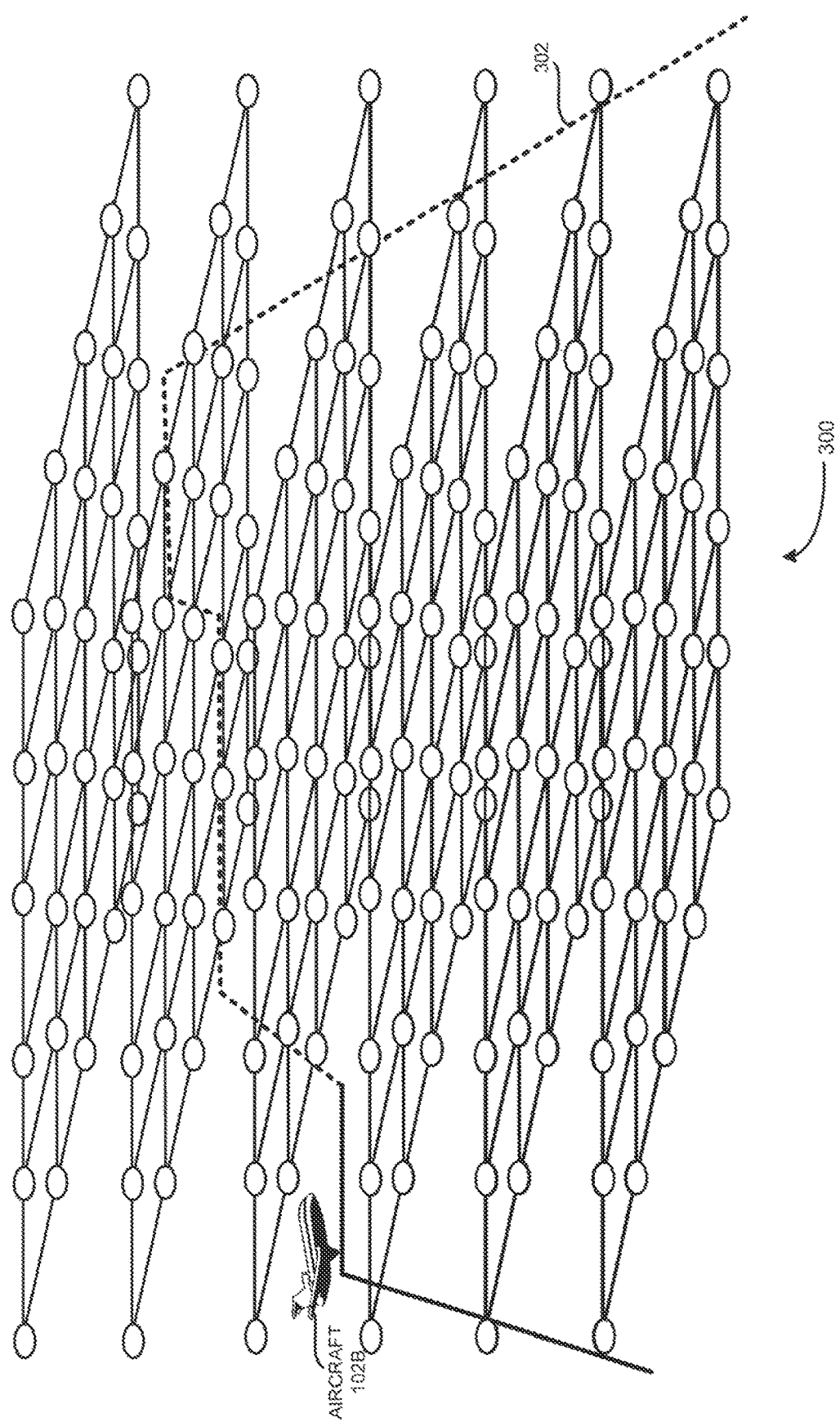
FIG. 3 is a schematic diagram illustrating identifying weather information for a predicted flight trajectory of an aircraft from the weather grid, such as the one shown in FIG. 2, according to an embodiment.

Referring now to FIG. 3, which is a schematic diagram illustrating identifying weather information for a predicted flight trajectory 302 of the aircraft 102B, shown in FIG. 1, from a weather grid 300, according to an embodiment. The weather grid 300 is same as the weather grid 200, shown in FIG. 2. As shown in FIG. 3, the predicted flight trajectory 302 of the aircraft 102A is mapped on the weather grid 300. In one example, during pre-flight planning of the aircraft 102B, the FMS 104 computes detailed flight trajectory (e.g., the predicted flight trajectory 302) using forecasted weather information (e.g., wind information, temperature information and tropopause information) available before departure. The flight trajectory defines a vertical flight profile including aircraft altitudes along the flight trajectory.

In one embodiment, the weather information analysis module 118 identifies nodes in the weather grid 300 for the predicted flight trajectory 302. Further, the weather information analysis module 118 obtains the weather information for the predicted flight trajectory 302 of the aircraft 102B from the identified nodes in the weather grid 300. This is explained in detail with reference to FIGS. 5A to 7D.

Referring now to FIG. 4, which is a schematic diagram 400 illustrating a first plurality of altitudes 402A-N for a cruise phase of the predicted flight trajectory 302, shown in FIG. 3, of the aircraft 102B, shown in FIG. 1, according to an embodiment. As shown in FIG. 4, the first plurality of altitudes 402A-N includes an altitude (e.g., altitude 402B) of the cruise phase of the predicted flight trajectory 302 and a plurality of altitudes (e.g., altitudes 402A and 402C-N) above and below the altitude of the cruise phase of the predicted flight trajectory 302.

Figure 5B:
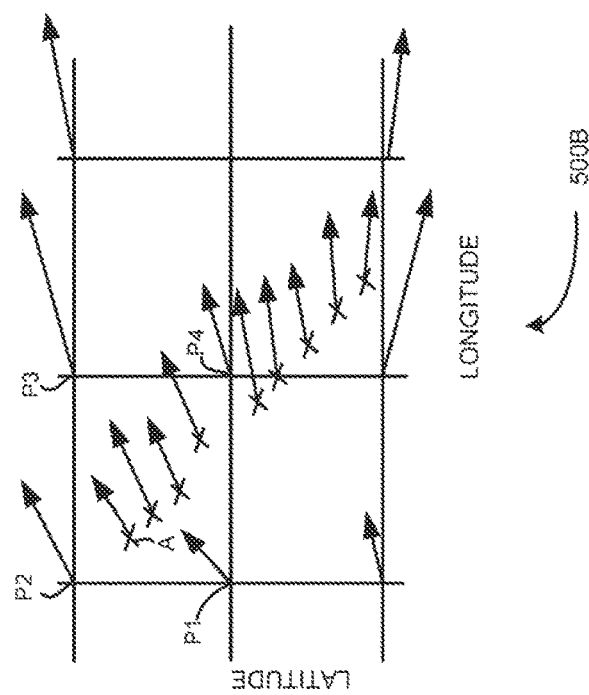
FIG. 5B is a schematic diagram illustrating wind information identified for points on a portion of the graph shown in FIG. 5A, according to an embodiment.
Figure 5A:
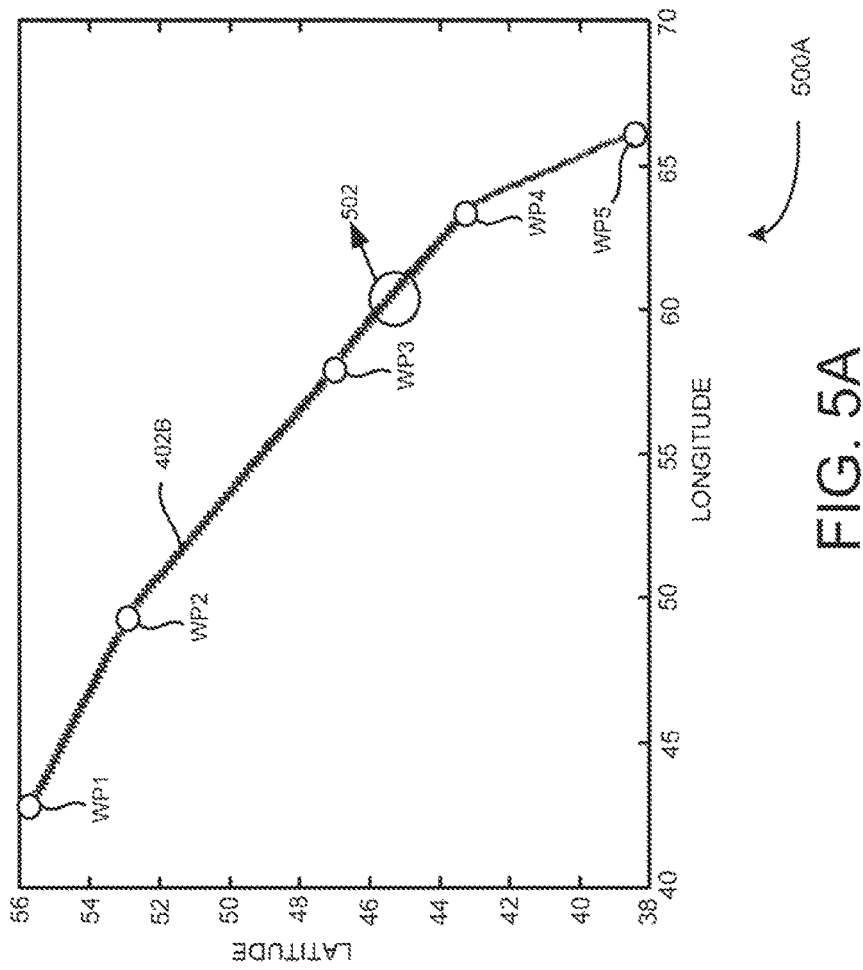
FIG. 5A is a graph depicting multiple points on one of the first plurality of altitudes for which weather information needs to be identified, according to an embodiment.

Referring now to FIG. 5A, which is a graph 500A depicting multiple points on the altitude 402B, shown in FIG. 4, for which weather information needs to be identified, according to an embodiment. As shown in FIG. 5A, the x-axis indicates longitude and y-axis indicates latitude. Further as shown in FIG. 5A, waypoints (WP) 1-5 indicate the waypoints on the altitude 402B. Furthermore as shown in FIG. 5A, each point on the altitude 402B is associated with latitude and longitude values. In one embodiment, the weather information analysis module 118 obtains weather information for each of the points on the altitude 402B from the weather grid 300 based the associated latitude and longitude values. Obtaining weather information (e.g., wind information) for a portion 502 of the graph 500A is explained in FIG. 5B.

Referring now to FIG. 5B, which is a schematic diagram 500B illustrating wind information identified for points on the portion 502 of the graph 500A, shown in FIG. 5A, according to an embodiment. Particularly, 500B illustrates points in the portion 502 mapped on the weather grid 300, shown in FIG. 3. As shown in FIG. 5B, nodes P1-P4 indicate nodes in the weather grid 300 including the on-board weather information obtained from the aircraft 102A, shown in FIG. 1.

In the example illustrated in FIG. 5B, a point A (e.g., the point A is one of the points in the portion 502) is mapped in between the nodes P1-P4. Further, the weather information analysis module 118 identifies wind information (e.g., wind speed and direction information) for the point A based on wind information associated with the nodes P1-P4. For example, simple interpolation techniques are used to identify the wind information at the point A based on the wind information associated with the nodes P1-P4. In the example illustrated in FIG. 5B, arrows indicate the wind information. For example, the length of the arrows indicates the wind speed and the direction of the arrows indicates the wind direction.

Similarly, the weather information analysis module 118 identifies wind information for all the points in the portion 502, as shown in FIG. B. Further, the weather information analysis module 118 identifies wind information for all the points on the altitude 402B. Furthermore, wind component information is obtained along perpendicular axes, shown in FIG. 6B.

In one example, the weather information analysis module 118 identifies wind information for the points on the altitude 402B based on a current location of the aircraft 102B. In other words, the weather information analysis module 118 identifies the wind information for the portion of the cruise altitude 402B yet to be flown by the aircraft 102B. For example, if the current location of the aircraft 102B is at WP 2, then the weather information analysis module 118 identifies wind information for the points between the WP 2 to WP 5 on the altitude 402B.

Figure 5C:
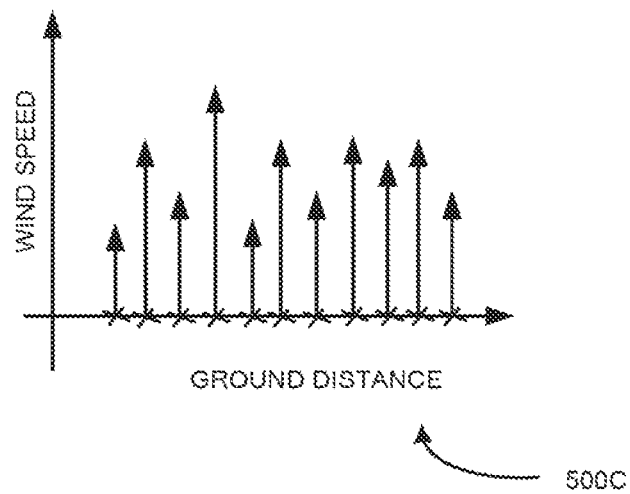
FIG. 5C is a graph depicting a wind speed profile determined using the wind information identified in FIG. 5B, according to an embodiment.

Referring now to FIG. 5C, which is a graph 500C depicting a wind speed profile determined using the wind information identified in FIG. 5B, according to an embodiment. Particularly, the graph 500C illustrates the wind speed profile determined for the altitude 402B. As shown in FIG. 5C, x-axis indicates ground distance and y-axis indicates wind speed. In one example, the wind speed profile is determined using the wind components obtained along one of the perpendicular axes, shown in FIG. 5B.

In one example embodiment, the weather information analysis module 118 compares the identified wind information with the wind information associated with forecasted weather information used for computing the altitude 402B of the cruise phase of the predicted flight trajectory 302, shown in FIG. 3, during pre-flight planning. Further, the weather information analysis module 118 selects a subset of the identified wind information when the identified wind information is substantially different from the wind information associated with the forecasted weather information.

Figure 5D:
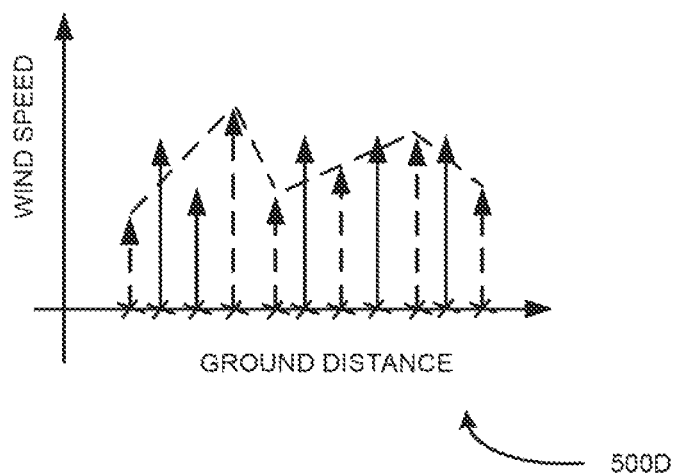
FIG. 5D is a graph depicting a subset of identified wind speed information selected from the wind speed profile obtained in FIG. 5C, according to an embodiment.

Referring now to FIG. 5D, which is a graph 500D depicting a subset of identified wind speed information selected from the wind speed profile determined in FIG. 5C, according to an embodiment. As shown in FIG. 5C, x-axis indicates ground distance and y-axis indicates wind speed. Further as shown in FIG. 5D, the dotted lines indicate the wind speed information selected from the wind speed profile shown in FIG. 5C. In one example, the weather information analysis module 118 processes the wind speed profile, shown in FIG. 5C, by applying FMS algorithms (e.g., FMS algorithm for wind modeling) in reverse to select the subset of identified wind speed information. The subset of identified wind speed information is selected such that the subset represents the complete wind speed profile shown in FIG. 5C. This is explained in detail with reference to FIG. 6.

In the examples illustrated in FIGS. 5A to 5D, the methods are described with reference to wind information associated with the altitude 402B. Similarly, the weather information analysis module 118 may select a subset of identified wind information for each of the first plurality of altitudes 402A and 402C-N, shown in FIG. 4. Similarly, the weather information analysis module 118 identifies temperature information for each of the first plurality of altitudes 402A-N and selects a subset of identified temperature information for each of the first plurality of altitudes 402A-N. Furthermore, the weather information analysis module 118 dynamically provides the subset of identified wind and temperature information to the FMS 104 in the aircraft 102B via the airline operation center 106.

In another example, the weather information analysis module 118 identifies tropopause information for each point on altitude 402B. Further, the weather information analysis module 118 dynamically provides the identified tropopause information to the FMS 104 in the aircraft 102B when the tropopause information changes beyond a threshold value.

In one example embodiment, during the cruise phase of the aircraft 102B, the process of identifying weather information is repeated at regular intervals. Further, the weather information analysis module 118 compares the identified weather information with previously identified weather information. Furthermore, the weather information analysis module 118 selects a subset of identified weather information when the identified weather information is substantially different from the previously identified weather information.

Further in this embodiment, the FMS 104 computes an optimized vertical flight profile for the cruise phase of the aircraft 102B based on the subset of identified wind and temperature information and the tropopause information.

Figure 6:
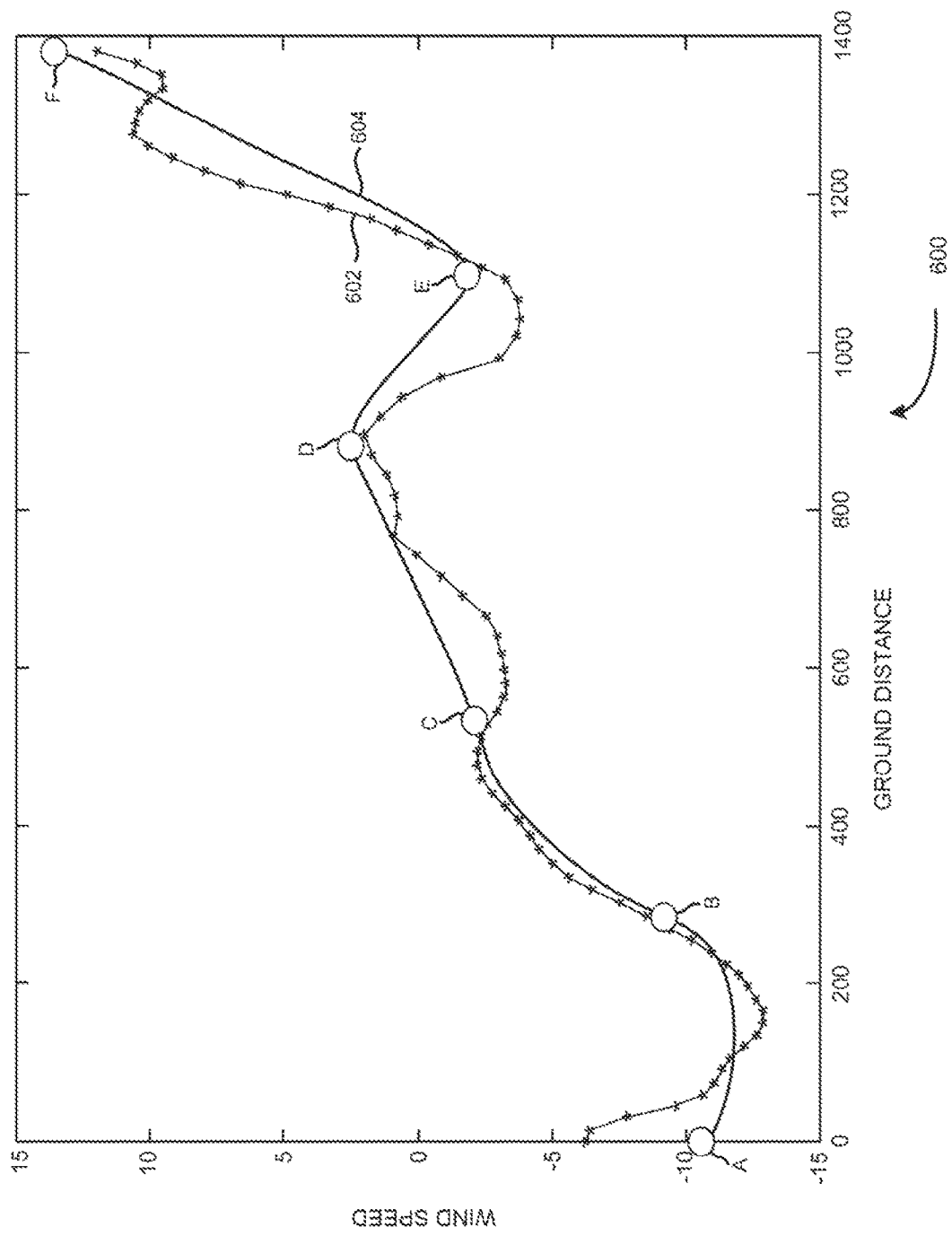
FIG. 6 is a graph depicting the subset of identified wind speed information, shown in FIG. 5D, and the wind speed profile shown in FIG. 5C, according to an embodiment.

Referring now to FIG. 6, which is a graph 600 depicting the subset of identified wind speed information, shown in FIG. 5D, and the wind speed profile shown in FIG. 5C, according to an embodiment. As shown in FIG. 6, x-axis indicates ground distance and y-axis indicates wind speed. Further as shown in FIG. 6, 602 indicates the wind speed profile obtained from FIG. 5C. Furthermore as shown in FIG. 6, 604 is obtained using the selected subset of identified wind speed information obtained in FIG. 5D. In addition as shown in FIG. 6, 604 closely represents the complete wind speed profile 602. For example, the points A-F correspond to the dotted lines shown in FIG. 5D.

Figure 7A:
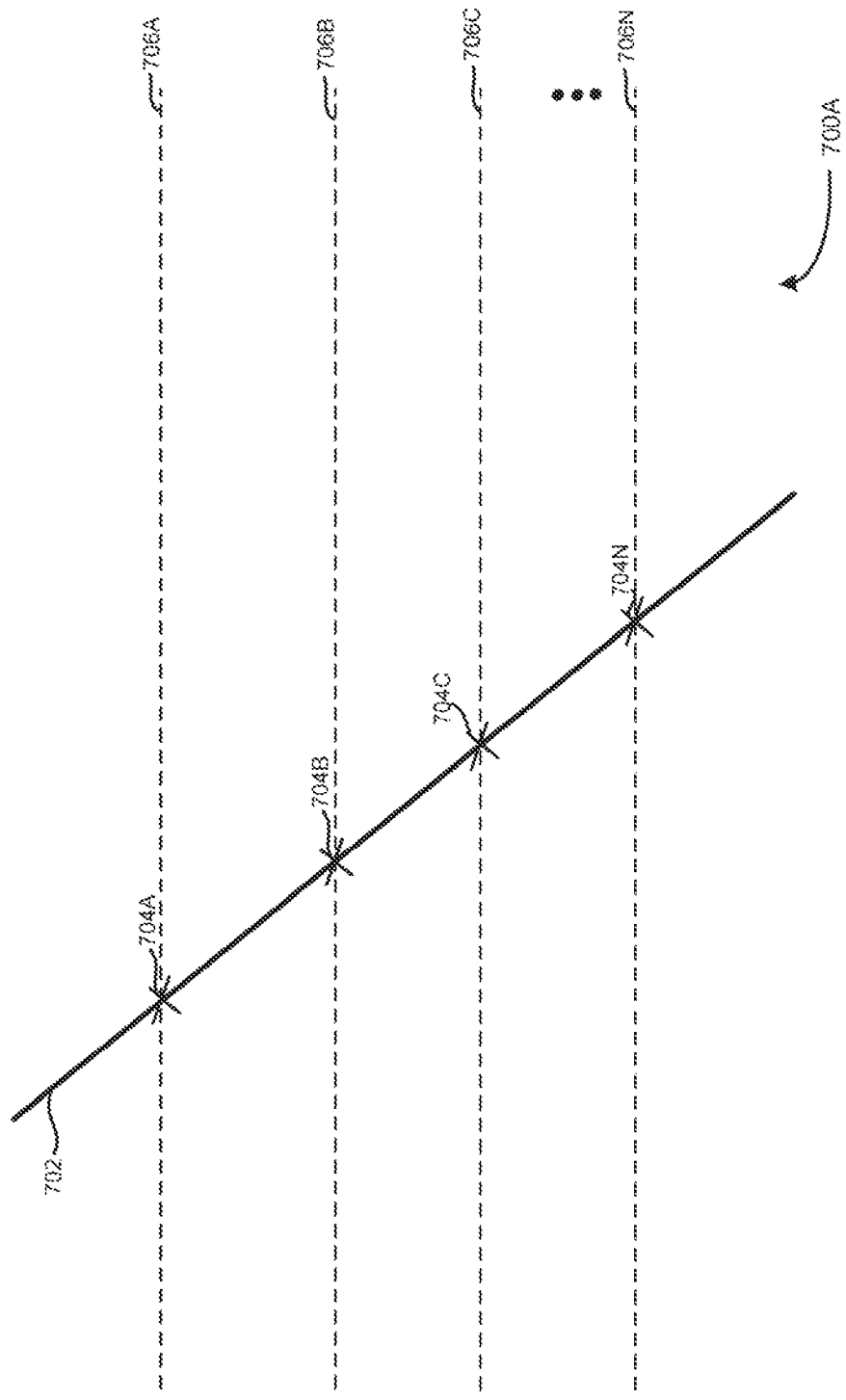
FIG. 7A is a schematic diagram illustrating multiple points on a second plurality of altitudes, for a descent phase along the predicted flight trajectory of the aircraft, for which weather information needs to be identified, according to an embodiment.

Referring now to FIG. 7A, which is a schematic diagram 700A illustrating multiple points 704A-N on the second plurality of altitudes 706A-N for a descent phase 702 along the predicted flight trajectory 302, shown in FIG. 3, of the aircraft 102B, shown in FIG. 1, for which weather information needs to be identified, according to an embodiment. As shown in FIG. 7A, the points 704A-N are associated with the second plurality of altitudes 706A-N, respectively. Further as shown in FIG. 7A, each of the points 704A-N is associated with latitude and longitude values. In one embodiment, weather information is obtained for each of the points 704A-N on the second plurality of altitudes 706A-N, respectively, from the weather grid 300 based the latitude and longitude values. This is explained in detail with reference to FIG. 7B.

Figure 7B:
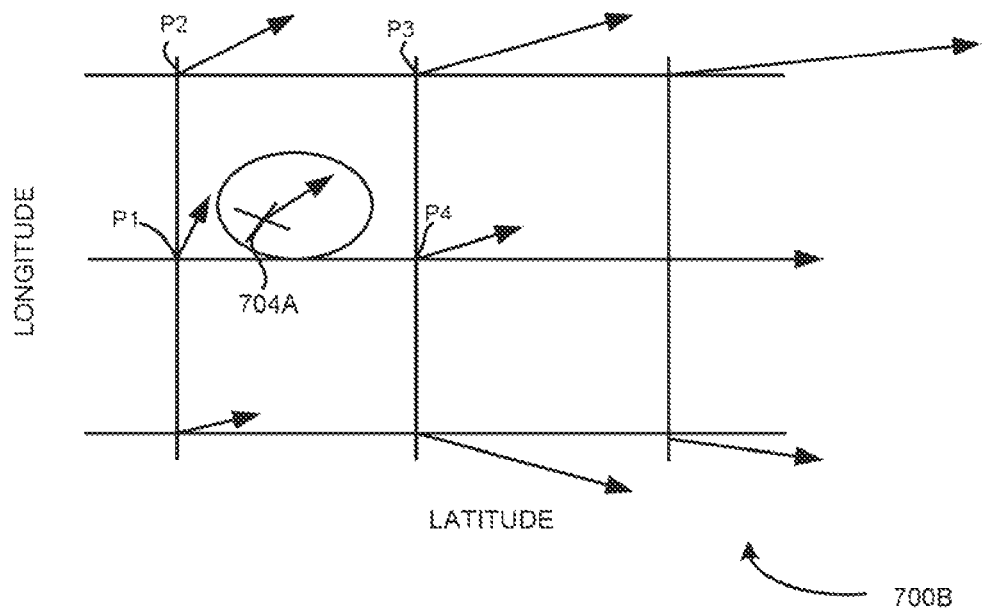
FIG. 7B is a schematic diagram illustrating wind information identified for a point on one of the second plurality of altitudes shown in FIG. 7A, according to an embodiment.

Referring now to FIG. 7B, which is a schematic diagram 700B illustrating wind information identified for a point 704A on one of the second plurality of altitudes 706A, shown in FIG. 7A, according to an embodiment. Particularly, 700B illustrates a section of the weather grid 300, shown in FIG. 3, at the altitude 706A. As shown in FIG. 7B, nodes P1-P4 indicate nodes in the weather grid 300 including the on-board weather information obtained from the aircraft 102A. Further as shown in FIG. 78B, the point 704A on the descent phase 702 of the aircraft 102B is mapped between the points P1-P4.

In one embodiment, the weather information analysis module 118 identifies wind information (e.g., wind speed and direction information) for the point 704A using the wind information associated with the nodes P1-P4. For example, simple interpolation techniques are used to compute the wind information at the point 704A using the wind information associated with the nodes P1-P4. Similarly, the weather information analysis module 118 identifies wind information for the points 704B-N on the second plurality of altitudes 706B-N, respectively, from the weather grid 300. In the example illustrated in FIG. 5B, arrows indicate the wind information. For example, the length of the arrows indicates the wind speed and the direction of the arrows indicates the wind direction. Further, wind components are obtained along perpendicular axes for each of the points 704B-N.

Figure 7C:
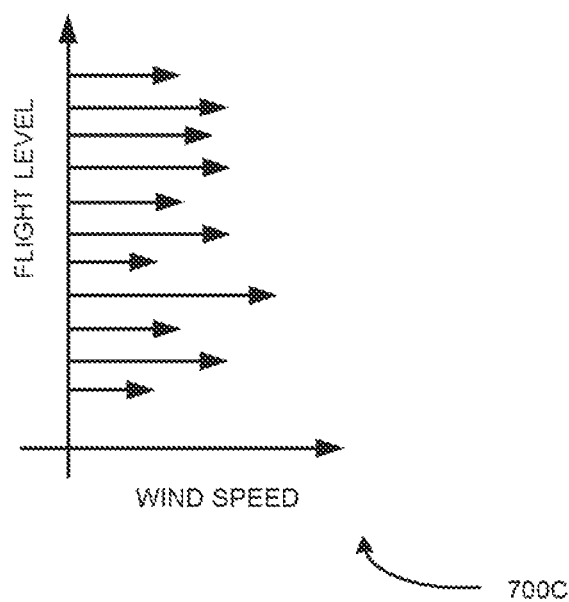
FIG. 7C is a graph depicting a wind speed profile determined using the wind information identified in FIG. 7B, according to an embodiment.

Referring now to FIG. 7C, which is a graph 700C depicting a wind speed profile determined using the wind information identified in FIG. 7B, according to an embodiment. As shown in FIG. 7C, the x-axis indicates wind speed and the y-axis indicates flight level. In this embodiment, the flight level indicates the second plurality of altitudes 706A-N. In the graph 700C, the wind components obtained along a perpendicular axis for the points 704A-N, using the method described with reference to FIG. 7B, are plotted against associated flight levels to obtain the wind speed profile for the descent phase 702.

In one example, the weather information analysis module 118 compares the identified wind speed information with the wind speed information associated with forecasted weather information used for computing the descent phase during pre-flight planning. Further, the weather information analysis module 118 selects a subset of the identified wind speed information when the identified wind speed information is substantially different from the wind speed information associated with the forecasted weather information.

Figure 7D:
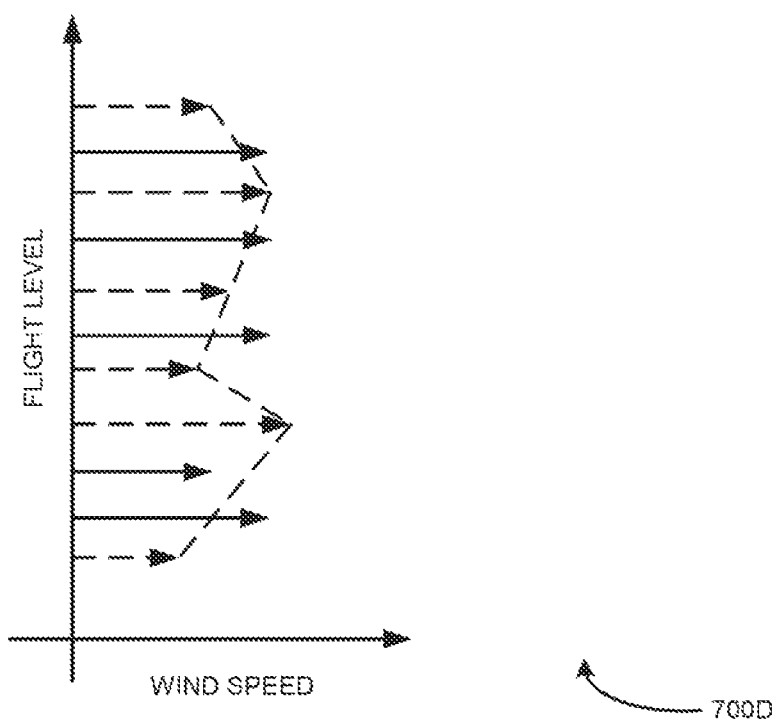
FIG. 7D is a graph depicting a subset of identified wind speed information selected from the wind speed profile obtained in FIG. 7C, according to an embodiment.

Referring now to FIG. 7D, which is a graph 700D depicting a subset of identified wind speed information selected from the wind speed profile obtained in FIG. 7C, according to an embodiment. As shown in FIG. 7D, x-axis indicates wind speed and y-axis indicates flight level. Further as shown in FIG. 7D, the dotted lines indicate the wind speed information selected from the wind speed profile shown in FIG. 7C. In one example, the wind speed profile shown in FIG. 7C is processed by the weather information analysis module 118 by applying FMS algorithms in reverse to select the subset of wind speed information from the wind speed profile obtained in FIG. 7C. The subset of identified wind speed information is selected such that the subset represents the complete wind speed profile shown in FIG. 7C. This is explained in detail with reference to FIG. 8.

In the examples illustrated in FIGS. 7A-7D, the methods are described with reference to wind information associated with the descent phase of the aircraft 102B. Similarly, the weather information analysis module 118 identifies temperature information and selects a subset of identified temperature information for the descent phase 702. Furthermore, the weather information analysis module 118 dynamically provides the subset of identified wind and temperature information to the FMS 104 in the aircraft 102B via the airline operation center 106.

In another example, the weather information analysis module 118 identifies tropopause information for the descent phase 702. Further, the weather information analysis module 118 dynamically provides the identified tropopause information to the FMS 104 in the aircraft 102B when the tropopause information changes beyond a threshold value.

In one embodiment, the FMS 104 computes an optimized vertical flight profile for the descent phase 702 of the aircraft 102B based on the subset of identified wind and temperature information and the tropopause information. Similarly, the FMS 104 computes an optimized vertical flight profile for the climb phase of the aircraft 102B based on subset of identified wind and temperature information and the tropopause information selected for the climb phase.

Figure 8:
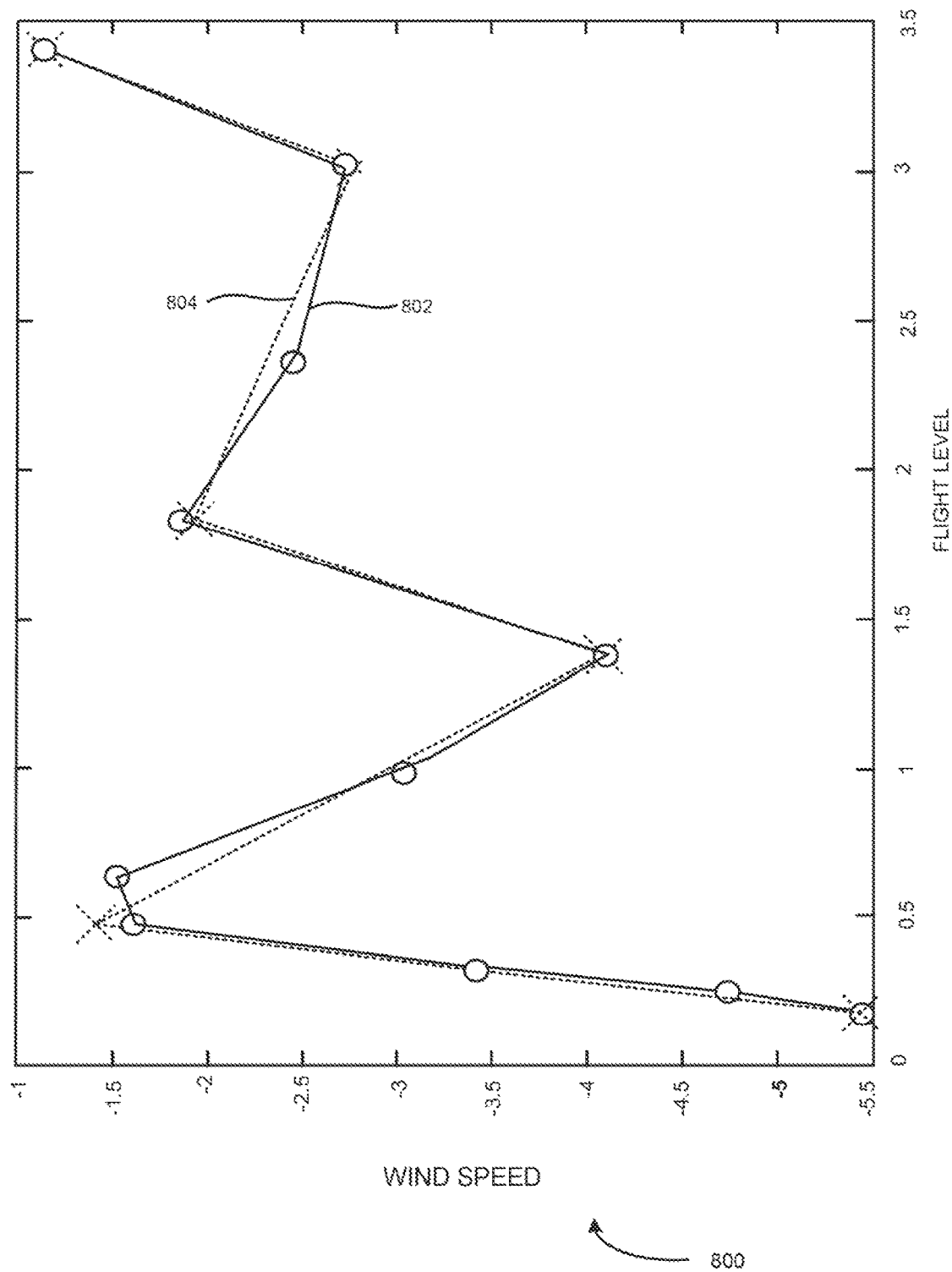
FIG. 8 is a graph depicting the subset of identified wind speed information, shown in FIG. 7D, and the wind speed profile shown in FIG. 7C, according to an embodiment.

Referring now to FIG. 8, which is a graph 800 depicting the subset of identified wind speed information, shown in FIG. 7D, and the wind speed profile shown in FIG. 7C, according to an embodiment. As shown in FIG. 8, x-axis indicates wind speed and y-axis indicates flight level. Further as shown in FIG. 8, 802 indicates the wind speed profile obtained from the FIG. 7C. Furthermore as shown in FIG. 8, 804 is obtained using the selected subset of identified wind speed information obtained in FIG. 7D. In addition as shown in FIG. 8, 804 closely represents the complete wind speed profile 802.

Figure 9:
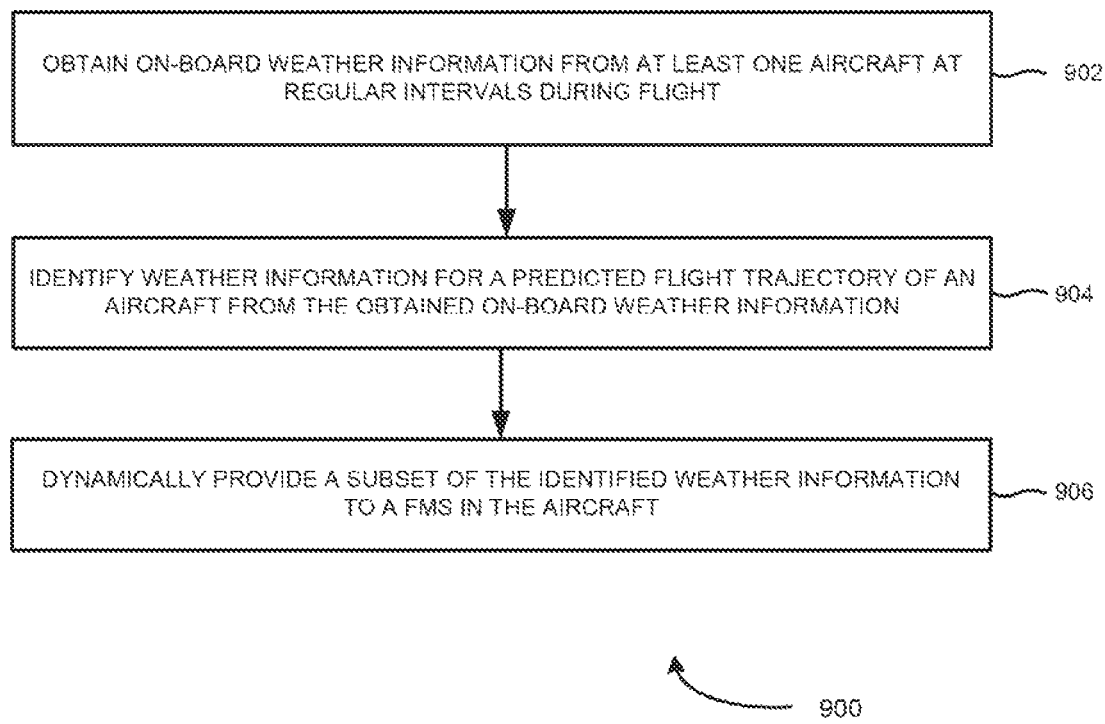
FIG. 9 is a flow chart illustrating an exemplary method for providing in-flight weather information to compute an optimized vertical flight profile, according to an embodiment.

Referring now to FIG. 9, which illustrates a flow diagram 900 of an exemplary method for providing in-flight weather information to compute an optimized vertical flight profile, according to one embodiment. At step 902, on-board weather information is obtained from one or more aircraft at regular intervals during flight. For example, weather information includes wind speed information, wind direction information, temperature information, pressure, and the like. This is explained in detail with reference to FIGS. 1 and 2.

At step 904, weather information is identified for a predicted flight trajectory of an aircraft from the obtained on-board weather information. This is explained in detail with reference to FIG. 3. For example, the aircraft is preceding the one or more aircraft. In one embodiment, weather information is identified for a first plurality of altitudes for a cruise phase of the predicted flight trajectory from the obtained on-board weather information. This is explained in detail with reference to FIGS. 5A and 5B. For example, the first plurality of altitudes includes an altitude of the predicted flight trajectory and a plurality of altitudes above and below the altitude of the predicted flight trajectory, as shown in FIG. 4.

Further, weather information is identified for a second plurality of altitudes for a climb phase and a descent phase along the predicted flight trajectory from the obtained on-board weather information. For example, the second plurality of altitudes includes altitudes encountered along the predicted flight trajectory for the climb phase and the descent phase of the aircraft. This is explained in detail with reference to FIG. 7A.

At step 906, a subset of the identified weather information is dynamically provided to a flight management system (FMS) in the aircraft, during flight, to compute the optimized vertical flight profile. In one embodiment, a weather profile is determined for each of the first plurality of altitudes for the cruise phase of the aircraft based on the identified weather information. Furthermore, a weather profile is determined for each of the climb phase and the descent phase of the aircraft along the second plurality of altitudes based on the identified weather information. For example, the weather profile includes a wind speed profile, a wind direction profile, a temperature profile and so on.

In addition, a subset of the identified weather information is selected from each weather profile associated with the each of the first plurality of altitudes, the climb phase and the descent phase, such that the selected subset of identified weather information for each weather profile represents the associated weather profile. This is explained in detail with reference to FIGS. 5D, 6, 7D and 8.

The methods described herein with reference to FIGS. 1 to 9, are performed in the weather information analysis module 118 in the ground station 110. However, one can envision that, the weather information analysis module 118 may be deployed on-board aircrafts.

Referring now to FIG. 10, which is a block diagram 1000 of an exemplary physical computing system 1002 (e.g., weather information analysis system 110 shown in FIG. 1) for implementing the weather information analysis module 118, according to an embodiment. In particular, FIG. 10 shows the computing system 1002 that may be utilized to implement the weather information analysis module 118. Note that one or more general purpose virtual or physical computer systems suitably instructed may be used to implement the weather information analysis module 118. In addition, computing system 1002 may comprise one or more distinct computing systems/devices and may span distributed locations.

In the embodiment shown, computing system 1002 may comprise computer memory ("memory") 1004, display 1006, one or more CPUs 1008, input/output devices 1010 (e.g., keyboard, mouse, etc.), other computer-readable media 1012, and network connections 1014. The weather information analysis module 118 is shown residing in memory 1004. The components of the weather information analysis module 118 may execute on one or more CPUs 1008 and implement techniques described herein. Other code or programs 1018 (e.g., an administrative interface, a Web server, and the like) may also reside in memory 1004, and execute on one or more CPUs 1008. Further, other data repositories, such as data store 1016, may also reside in computing system 1002. One or more of the components in FIG. 10 may not be present in any specific implementation. For example, some embodiments may not provide other computer readable media 1012 and/or display 1006.

The weather information analysis module 118 interacts via communication network with airline operation centers. The communication network may be any combination of media (e.g., twisted pair, coaxial, fiber optic, radio frequency), hardware (e.g., routers, switches, repeaters, transceivers), and protocols (e.g., TCP/IP, UDP, Ethernet, Wi-Fi, WiMAX) that facilitate communication to and from remotely situated humans and/or devices.

In addition, programming interfaces to the data stored as part of the weather information analysis module 118, such as in data store 1016, can be available by standard mechanisms such as through C, C++, C#, and Java APIs; libraries for accessing files, databases, or other data repositories; through scripting languages such as XML; or through Web servers, FTP servers, or other types of servers providing access to stored data. Furthermore, in some embodiments, some or all of the components of the weather information analysis module 118 may be implemented or provided in other manners, such as at least partially in firmware and/or hardware, including, but not limited to one or more application-specific integrated circuits ("ASICs"), standard integrated circuits, controllers executing appropriate instructions, and including microcontrollers and/or embedded controllers, field-programmable gate arrays ("FPGAs"), complex programmable logic devices ("CPLDs"), and the like.

Some or all of the system components and/or data structures may also be stored as contents (e.g., as executable or other machine-readable software instructions or structured data) on a non-transitory computer-readable medium (e.g., as a hard disk; a memory; a computer network or cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use or provide the contents to perform at least some of the described techniques. Some or all of the components and/or data structures may be stored on tangible, non-transitory storage mediums. Some or all of the system components and data structures may also be provided as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

The methods and systems described herein improve situational weather awareness of aircrafts by sending updated weather information at regular intervals. Further, the methods and systems enable FMS in the aircraft to compute an optimized vertical flight profile using the weather information. This enables the aircraft to fly at optimal altitudes, speeds and thrust settings. As a result, fuel consumption in the aircraft is optimized and estimated time of arrival (ETA) is improved.

Although the present embodiments have been described with reference to specific example embodiments, it will be evident that various modifications and changes may be made to these embodiments without departing from the broader spirit and scope of the various embodiments. Furthermore, the various devices, modules, analyzers, generators, and the like described herein may be enabled and operated using hardware circuitry, for example, complementary metal oxide semiconductor based logic circuitry, firmware, software and/or any combination of hardware, firmware, and/or software embodied in a machine readable medium. For example, the various electrical structure and methods may be embodied using transistors, logic gates, and electrical circuits, such as application specific integrated circuit.

What is claimed is:

1. A method for providing in-flight weather information to compute an optimized vertical flight profile, comprising:
   obtaining, by a weather information analysis module in a ground station, on-board weather information from at least one aircraft at regular intervals during flight;
   identifying, by the weather information analysis module, weather information for a predicted flight trajectory of an aircraft from the obtained on-board weather information, wherein the aircraft is preceding the at least one aircraft, wherein identifying the weather information comprises:
      identifying weather information for a first plurality of altitudes for a cruise phase of the predicted flight trajectory from the obtained on-board weather information, wherein the first plurality of altitudes includes an altitude of the predicted flight trajectory and a plurality of altitudes above and below the altitude of the predicted flight trajectory;
   determining, by the weather information analysis module, a subset of the identified weather information by analyzing the identified weather information for the first plurality of altitudes, wherein the subset of the identified weather information includes a weather profile that the aircraft encounters ahead;
   dynamically providing, during flight, the subset of the identified weather information associated with the first plurality of altitudes to a flight management system (FMS) in the aircraft;
   computing, by the FMS in the aircraft, the optimized vertical flight profile based on the subset of the identified weather information; and
   enabling the aircraft to fly in a flight trajectory defined by the optimized vertical flight profile.

2. The method of claim 1, wherein identifying the weather information for the predicted flight trajectory of the aircraft from the obtained on-board weather information comprises:
   identifying weather information for a second plurality of altitudes for a climb phase and a descent phase along the predicted flight trajectory from the obtained on-board weather information.

3. The method of claim 2, wherein the second plurality of altitudes includes altitudes encountered along the predicted flight trajectory for the climb phase and the descent phase of the aircraft.

4. The method of claim 2, wherein dynamically providing the subset of the identified weather information to the FMS in the aircraft, during flight, to compute the optimized vertical flight profile comprises:
   determining a weather profile for each of the first plurality of altitudes for the cruise phase of the aircraft based on the identified weather information;
   determining a weather profile for each of the climb phase and the descent phase of the aircraft along the second plurality of altitudes based on the identified weather information;
   selecting a subset of the identified weather information from each weather profile associated with the each of the first plurality of altitudes, the climb phase and the descent phase, such that the selected subset of identified weather information for each weather profile represents the weather profile; and
   dynamically providing the subset of identified weather information to the FMS in the aircraft, during flight, to compute the optimized vertical flight profile.

5. The method of claim 4, wherein the weather profile comprises a wind speed profile, a wind direction profile and a temperature profile.

6. The method of claim 1, wherein the weather information comprises wind speed information, wind direction information, temperature information, pressure and tropopause information.

7. A weather information analysis system in a ground station, the system comprising:
   at least one processor;
   memory coupled to the at least one processor, wherein the memory comprises a weather information analysis module to:
      obtain on-board weather information from at least one aircraft at regular intervals during flight;
      identify weather information for a predicted flight trajectory of an aircraft from the obtained on-board weather information, wherein the aircraft is preceding the at least one aircraft, wherein identifying the weather information comprises:
         identifying weather information for a first plurality of altitudes for a cruise phase of the predicted flight trajectory from the obtained on-board weather information, wherein the first plurality of altitudes includes an altitude of the predicted flight trajectory and a plurality of altitudes above and below the altitude of the predicted flight trajectory;
      determine a subset of the identified weather information by analyzing the identified weather information for the first plurality of altitudes, wherein the subset of the identified weather information includes a weather profile that the aircraft encounters ahead; and
      dynamically provide, during flight, the subset of the identified weather information associated with the first plurality of altitudes to a flight management system (FMS) in the aircraft, wherein the FMS in the aircraft is to:
         compute the optimized vertical flight profile based on the subset of the identified weather information; and
         enable the aircraft to fly in a flight trajectory defined by the optimized vertical flight profile.

8. The weather information analysis system of claim 7, wherein the weather information analysis module is configured to:
   identify weather information for a second plurality of altitudes for a climb phase and a descent phase along the predicted flight trajectory from the obtained on-board weather information.

9. The weather information analysis system of claim 8, wherein the second plurality of altitudes includes altitudes encountered along the predicted flight trajectory for the climb phase and the descent phase of the aircraft.

10. The weather information analysis system of claim 8, wherein the weather information analysis module is configured to:
   determine a weather profile for each of the first plurality of altitudes for the cruise phase of the aircraft based on the identified weather information;
   determine a weather profile for each of the climb phase and the descent phase of the aircraft along the second plurality of altitudes based on the identified weather information;
   select a subset of the identified weather information from each weather profile associated with the each of the first plurality of altitudes, the climb phase and the descent phase, such that the selected subset of identified weather information for each weather profile represents the weather profile; and
   dynamically provide the subset of identified weather information to the FMS in the aircraft, during flight, to compute the optimized vertical flight profile.

11. The weather information analysis system of claim 10, wherein the weather profile comprises a wind speed profile, a wind direction profile and a temperature profile.

12. The weather information analysis system of claim 7, wherein the weather information comprises wind speed information, wind direction information, temperature information, pressure and tropopause information.

13. A non-transitory computer readable storage medium including instructions that are configured, when executed by a computing device of a ground station, to provide in-flight weather information to compute an optimized vertical flight profile, the method comprising:
   obtaining on-board weather information from at least one aircraft at regular intervals during flight;
   identifying weather information for a predicted flight trajectory of an aircraft from the obtained on-board weather information, wherein the aircraft is preceding the at least one aircraft, wherein identifying the weather information comprises:
      identifying weather information for a first plurality of altitudes for a cruise phase of the predicted flight trajectory from the obtained on-board weather information, wherein the first plurality of altitudes includes an altitude of the predicted flight trajectory and a plurality of altitudes above and below the altitude of the predicted flight trajectory;
   determining a subset of the identified weather information by analyzing the identified weather information for the first plurality of altitudes, wherein the subset of the identified weather information includes a weather profile that the aircraft encounters ahead;

dynamically providing, during flight, the subset of the identified weather information associated with the first plurality of altitudes to a flight management system (FMS) in the aircraft;

enabling the FMS in the aircraft to compute the optimized vertical flight profile based on the subset of the identified weather information; and enabling the aircraft to fly in a flight trajectory defined by the optimized vertical flight profile.

14. The non-transitory computer readable storage medium of claim 13, wherein identifying the weather information for the predicted flight trajectory of the aircraft from the obtained on-board weather information comprises:

identifying weather information for a second plurality of altitudes for a climb phase and a descent phase along the predicted flight trajectory from the obtained on-board weather information.

15. The non-transitory computer readable storage medium of claim 14, wherein the second plurality of altitudes includes altitudes encountered along the predicted flight trajectory for the climb phase and the descent phase of the aircraft.

16. The non-transitory computer readable storage medium of claim 14, wherein dynamically providing the subset of the identified weather information to the FMS in the aircraft, during flight, to compute the optimized vertical flight profile comprises:

determining a weather profile for each of the first plurality of altitudes for the cruise phase of the aircraft based on the identified weather information;

determining a weather profile for each of the climb phase and the descent phase of the aircraft along the second plurality of altitudes based on the identified weather information;

selecting a subset of the identified weather information from each weather profile associated with the each of the first plurality of altitudes, climb phase and the descent phase, such that the selected subset of identified weather information for each weather profile represents the weather profile; and dynamically providing the subset of identified weather information to the FMS in the aircraft, during flight, to compute the optimized vertical flight profile.

17. The non-transitory computer readable storage medium of claim 16, wherein the weather profile comprises a wind speed profile, a wind direction profile and a temperature profile.

18. The non-transitory computer readable storage medium of claim 13, wherein the weather information comprises wind speed information, wind direction information, temperature information, pressure and tropopause information.

19. A system for computing an optimized vertical flight profile of an aircraft, the system comprising:

a flight management system (FMS) in the aircraft;

at least one airline operation center; and a ground station communicatively connected to the FMS via the at least one airline operation center, the ground station comprising:

at least one processor;

memory coupled to the at least one processor; and a weather grid residing in the memory, wherein the memory comprises a weather information analysis module to:

obtain on-board weather information from at least one aircraft at regular intervals during flight via the at least one airline operation center;

update the weather grid using the obtained on-board weather information from the at least one aircraft, wherein the weather grid comprises geographical area which is divided into a mesh of regularly spaced nodes;

identify weather information for a predicted flight trajectory of the aircraft from the updated weather grid, wherein the aircraft is preceding the at least one aircraft, wherein identifying the weather information comprises:

identifying weather information for a first plurality of altitudes for a cruise phase of the predicted flight trajectory from the updated weather grid, wherein the first plurality of altitudes includes an altitude of the predicted flight trajectory and a plurality of altitudes above and below the altitude of the predicted flight trajectory;

determine a subset of the identified weather information by analyzing the identified weather information for the first plurality of altitudes using the updated weather grid, wherein the subset of the identified weather information includes a weather profile that the aircraft encounters ahead; and dynamically provide, during flight, the subset of the identified weather information associated with the first plurality of altitudes to the FMS in the aircraft via the at least one airline operation center, wherein the FMS in the aircraft is to:

compute the optimized vertical flight profile based on the subset of the identified weather information; and enable the aircraft to fly in a flight trajectory defined by the optimized vertical flight profile.

20. The method of claim 1, wherein the vertical flight profile comprises departure and arrival points, waypoints, estimated time, speed and altitude at each waypoint, top of climb (TOC), top of descent (TOD) point and the like.

21. The weather information analysis system of claim 7, wherein the vertical flight profile comprises departure and arrival points, waypoints, estimated time, speed and altitude at each waypoint, top of climb (TOC), top of descent (TOD) point and the like.

22. The non-transitory computer readable storage medium of claim 13, wherein the vertical flight profile comprises departure and arrival points, waypoints, estimated time, speed and altitude at each waypoint, top of climb (TOC), top of descent (TOD) point and the like.

* * * * *